(12) United States Patent
Inakura

(10) Patent No.: US 12,327,686 B2
(45) Date of Patent: Jun. 10, 2025

(54) FILM CAPACITOR AND FILM FOR FILM CAPACITOR

(71) Applicant: Murata Manufacturing Co., Ltd., Nagaokakyo (JP)

(72) Inventor: Tomoki Inakura, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 741 days.

(21) Appl. No.: 17/548,726

(22) Filed: Dec. 13, 2021

(65) Prior Publication Data

US 2022/0102072 A1 Mar. 31, 2022

Related U.S. Application Data

(63) Continuation of application No. PCT/JP2020/007367, filed on Feb. 25, 2020.

(30) Foreign Application Priority Data

Jul. 10, 2019 (JP) .................. 2019-128293

(51) Int. Cl.
*H01G 4/18* (2006.01)
*H01G 4/30* (2006.01)
*H01G 4/32* (2006.01)

(52) U.S. Cl.
CPC ............ *H01G 4/18* (2013.01); *H01G 4/30* (2013.01); *H01G 4/32* (2013.01)

(58) Field of Classification Search
CPC ............ H01G 4/18; H01G 4/30; H01G 4/32
USPC ................ 361/311, 301.5, 301.4
See application file for complete search history.

(56) References Cited

U.S. PATENT DOCUMENTS

| 8,790,558 | B2 | 7/2014 | Suzuki et al. |
| 2012/0087059 | A1* | 4/2012 | Kagata ............ H01G 4/012 |
| | | | 361/301.1 |
| 2012/0091622 | A1 | 4/2012 | Suzuki et al. |
| 2014/0368970 | A1* | 12/2014 | Ichikawa ........... C08G 18/6212 |
| | | | 525/534 |
| 2016/0079000 | A1* | 3/2016 | Koito ................ H01G 4/32 |
| | | | 361/275.4 |
| 2019/0103220 | A1* | 4/2019 | Hiraoka ............. H01G 4/005 |
| 2019/0172642 | A1* | 6/2019 | Yamazaki ........... H01G 4/18 |
| 2020/0211779 | A1 | 7/2020 | Inakura et al. |

FOREIGN PATENT DOCUMENTS

| JP | S5086670 A | 7/1975 |
| JP | S54144958 A | 11/1979 |
| JP | H0488160 A | 3/1992 |

(Continued)

OTHER PUBLICATIONS

International Search Report issued in PCT/JP2020/007367, dated May 26, 2020.

(Continued)

*Primary Examiner* — Arun Ramaswamy
(74) *Attorney, Agent, or Firm* — ArentFox Schiff LLP

(57) ABSTRACT

A film capacitor that includes a dielectric resin film having a first surface and a second surface facing each other in a thickness direction of the dielectric resin film, wherein the first surface of the dielectric resin film includes 25 to 125 of first recesses each having a long diameter of 30 nm to 800 nm per an area of 5 µm×5 µm; and a metal layer on the first surface of the dielectric resin film.

18 Claims, 7 Drawing Sheets

(56) References Cited

FOREIGN PATENT DOCUMENTS

| | | |
|---|---|---|
| JP | H05251266 A | 9/1993 |
| JP | 2004363431 A | 12/2004 |
| JP | 2012089609 A | 5/2012 |
| JP | 2015101677 A | 6/2015 |
| WO | 2013069485 A1 | 5/2013 |
| WO | 2015037229 A1 | 3/2015 |
| WO | 2019069540 A1 | 4/2019 |

OTHER PUBLICATIONS

Written Opinion of the International Search Report issued in PCT/JP2020/007367, dated May 26, 2020.

\* cited by examiner

FILM CAPACITOR AND FILM FOR FILM CAPACITOR

CROSS REFERENCE TO RELATED APPLICATIONS

The present application is a continuation of International application No. PCT/JP2020/007367, filed Feb. 25, 2020, which claims priority to Japanese Patent Application No. 2019-128293, filed Jul. 10, 2019, the entire contents of each of which are incorporated herein by reference.

FIELD OF THE INVENTION

The present invention relates to a film capacitor and a film for a film capacitor.

BACKGROUND OF THE INVENTION

A film capacitor generally includes a flexible resin film used as a dielectric and having a structure in which a first counter electrode and a second counter electrode face each other with the resin film interposed therebetween. Such a film capacitor is produced, for example, by winding or stacking a resin film on which the first counter electrode is formed and a resin film on which the second counter electrode is formed.

For example, Patent Document 1 discloses a film capacitor including dielectric resin films in a form of overlapping each other, first and second counter electrodes disposed to face each other with the dielectric resin films interposed therebetween, and first and second terminal electrodes electrically connected to the first and second counter electrodes, respectively, wherein each of the dielectric resin films has a surface roughness Ra of at least one main surface of 3 nm to 1000 nm, includes a thermosetting resin having a glass transition point of 130° C. or more as a resin component, and has a weight of a pyrolysis residue at 500° C. of 40 wt % or less when the thermal weight change rate of the resin component is measured at a temperature rising rate of 10° C./min in nitrogen.

Patent Document 1: WO 2013/069485 A

SUMMARY OF THE INVENTION

In the film capacitor described in Patent Document 1, setting the surface roughness Ra of the dielectric resin film to 3 nm to 1000 nm allows a slight gap to be formed between the films overlapping each other when the dielectric resin film is wound or stacked. Therefore, decomposed gas easily scatters from inside the film capacitor, and the self-healing function works well.

However, because the dielectric resin film has high heat resistance, the dielectric resin film may not be pyrolyzed at the time of short circuit, and the decomposed gas may not scatter. Therefore, it can be said that there is room for improvement in self-healing properties.

The present invention has been made to solve the above problems, and an object of the present invention is to provide a film capacitor having good self-healing properties in which a dielectric resin film is easily pyrolyzed at the time of short circuit. Another object of the present invention is to provide a film for a film capacitor used as a dielectric resin film of the film capacitor.

In a first aspect, the film capacitor of the present invention includes a dielectric resin film having a first surface and a second surface facing each other in a thickness direction of the dielectric resin film, wherein the first surface of the dielectric resin film includes 25 to 125 of first recesses each having a long diameter of 30 nm to 800 nm per an area of 5 µm×5 µm; and a metal layer on the first surface of the dielectric resin film.

In a second aspect, the film capacitor of the present invention includes a dielectric resin film having a first surface and a second surface facing each other in a thickness direction of the dielectric resin film, wherein the first surface of the dielectric resin film includes first recesses; and a metal layer on the first surface of the dielectric resin film, wherein a surface of the metal layer not in contact with the first surface of the dielectric resin film includes 25 to 125 of third recesses each having a long diameter of 30 nm to 800 nm per an area of 5 µm×5 µm and which correspond to the first recesses on the first surface of the dielectric resin film.

The film for a film capacitor of the present invention includes a dielectric resin film having a first surface and a second surface facing each other in a thickness direction of the dielectric resin film, wherein the first surface of the dielectric resin film includes 25 to 125 of first recesses each having a long diameter of 30 nm to 800 nm per an area of 5 µm×5 µm.

According to the present invention, it is possible to provide a film capacitor having good self-healing properties in which a dielectric resin film is easily pyrolyzed at the time of short circuit.

DETAILED DESCRIPTION OF THE INVENTION

Hereinafter, a film capacitor and a film for a film capacitor of the present invention will be described.

The present invention is not limited to the following configurations and can be appropriately modified and applied without changing the spirit of the present invention.

A combination of two or more of the individual desirable configurations of the invention described below are also the present invention.

[Film Capacitor]

A film capacitor of the present invention includes a dielectric resin film having a first surface and a second surface facing each other in a thickness direction, and a metal layer on the first surface of the dielectric resin film.

Hereinafter, as one embodiment of the film capacitor of the present invention, a wound film capacitor obtained by winding a first dielectric resin film provided with a first metal layer and a second dielectric resin film provided with a second metal layer in a stacked state will be described as an example. The film capacitor of the present invention may be a stacked film capacitor or the like formed by stacking the first dielectric resin film provided with the first metal layer and the second dielectric resin film provided with the second metal layer.

Figure 1:
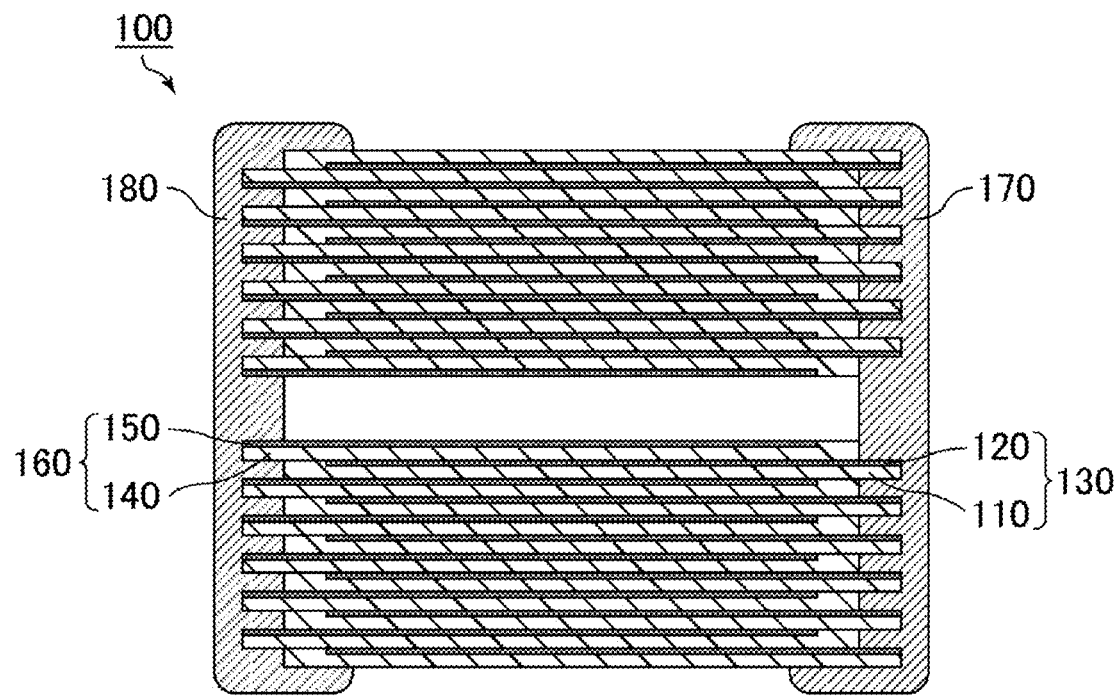
FIG. 1 is a sectional view schematically showing an example of a film capacitor of the present invention.

FIG. 1 is a sectional view schematically showing an example of a film capacitor of the present invention.

A film capacitor 100 shown in FIG. 1 is a wound film capacitor and is configured by winding a first metalized film 130 in which a first metal layer (counter electrode) 120 is provided on one surface of a first dielectric resin film 110, and a second metalized film 160 in which a second metal layer (counter electrode) 150 is provided on one surface of a second dielectric resin film 140. The film capacitor 100 further includes a first external terminal electrode 170 electrically connected to the first metal layer 120 and a second external terminal electrode 180 electrically connected to the second metal layer 150.

The first metal layer 120 is formed to reach one side edge of the first metalized film 130 but not to reach the other side edge. The second metal layer 150 is formed not to reach one side edge of the second metalized film 160 but to reach the other side edge. The first metal layer 120 and the second metal layer 150 are composed of, for example, aluminum, zinc, or the like.

The first metalized film 130 and the second metalized film 160 are stacked by being wound. As shown in FIG. 1, the first metalized film 130 and the second metalized film 160 are shifted from each other in the width direction such that both the end of the first metal layer 120 on the side reaching a side edge of the first metalized film 130 and the end of the second metal layer 150 on the side reaching a side edge of the second metalized film 160 are exposed.

In the film capacitor 100 shown in FIG. 1, winding is made such that the first metalized film 130 comes at the outer side of the second metalized film 160, and the first metal layer 120 of the first metalized film 130 and the second metal layer 150 of the second metalized film 160 face inward.

The first external terminal electrode 170 and the second external terminal electrode 180 are formed by, for example, thermal-spraying zinc or the like on each end surface of the capacitor main body obtained as described above. The first external terminal electrode 170 is in contact with the exposed end of the first metal layer 120, thereby being electrically connected to the first metal layer 120. On the other hand, the second external terminal electrode 180 is in contact with the exposed end of the second metal layer 150, thereby being electrically connected to the second metal layer 150.

The film capacitor of the present invention is preferably pressed to have a flat sectional shape such as an ellipse or an oval, so as to have a more compact shape as compared with a case where the sectional shape is a perfect circle. The film capacitor of the present invention may include a cylindrical winding axis. The winding axis is disposed on the central axis line of the metalized film in a wound state and serves as a winding axis when the metalized film is wound.

In the film capacitor of the present invention, the dielectric resin film may be used for both a first dielectric resin film 110 and a second dielectric resin film 140, or the dielectric resin film may be used for only one of them.

[Film for Film Capacitor]

Figure 2:
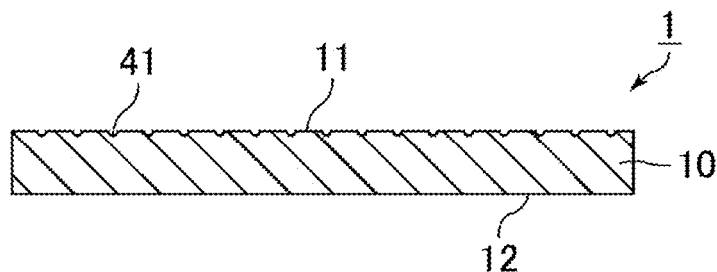
FIG. 2 is a sectional view schematically showing an example of a film for a film capacitor of the present invention.

FIG. 2 is a sectional view schematically showing an example of the film for a film capacitor of the present invention.

A film 1 for a film capacitor shown in FIG. 2 is composed of a dielectric resin film 10. The dielectric resin film 10 has a first surface 11 and a second surface 12 facing each other in the thickness direction. Recesses 41 are present as first recesses on the first surface 11 of the dielectric resin film 10. On the other hand, no recesses 41 are present on the second surface 12 of the dielectric resin film 10 of FIG. 2.

The recesses present on the first surface of the dielectric resin film may be confirmed by observing the first surface of the dielectric resin film with a scanning electron microscope (SEM). In an SEM photograph, a portion that looks black is determined as a recess.

Figure 3:
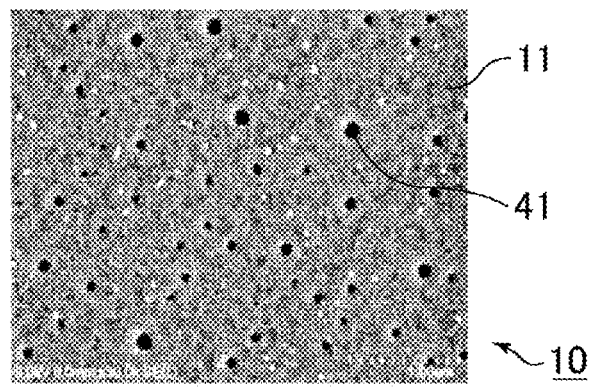
FIG. 3 is an example of an SEM photograph of a first surface of a dielectric resin film that forms the film for a film capacitor of the present invention.

FIG. 3 is an example of an SEM photograph of the first surface of the dielectric resin film that forms the film for a film capacitor of the present invention.

In FIG. 3, it can be confirmed that the recesses 41 are present on the first surface 11 of the dielectric resin film 10.

Figure 4:
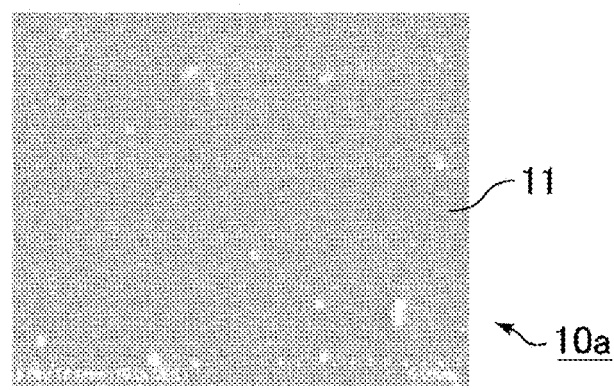
FIG. 4 is an example of an SEM photograph of a first surface of a dielectric resin film that forms a conventional film for a film capacitor.

FIG. 4 is an example of an SEM photograph of a first surface of a dielectric resin film that forms a conventional film for a film capacitor.

In FIG. 4, it can be confirmed that there are no recesses 41 on the first surface 11 of a dielectric resin film 10a.

In the film for a film capacitor of the present invention, among the recesses present on the first surface of the dielectric resin film, 25 to 125 of first recesses each having a long diameter of 30 nm to 800 nm are present per an area of 5 µm×5 µm.

The number of the first recesses may be determined by observing random areas of the first surface of the dielectric resin film at a magnification of 30,000 times with an SEM and counting the number of recesses each having a long diameter of 30 nm to 800 nm in an observation field of 5 µm×5 µm.

Figure 5:
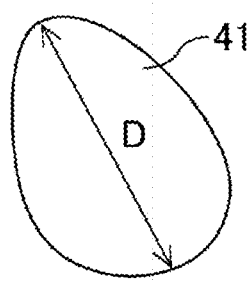
FIG. 5 is a plan view schematically showing a method for measuring a long diameter of a recess.

FIG. 5 is a plan view schematically showing a method for measuring a long diameter of a recess.

As shown in FIG. 5, when one of the recesses 41 is viewed from the thickness direction of the dielectric resin film, the length of the portion farthest from the opposing corners is defined as a long diameter D of the recess 41. The same applies to the case of measuring the long diameter of other recesses described later.

Figure 6:
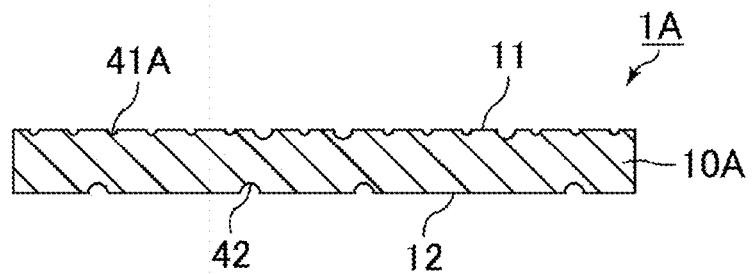
FIG. 6 is a sectional view schematically showing another example of the film for a film capacitor of the present invention.

FIG. 6 is a sectional view schematically showing another example of the film for a film capacitor of the present invention.

A film 1A for a film capacitor shown in FIG. 6 is made of a dielectric resin film 10A. Recesses 41A are present as first recesses on the first surface 11 of the dielectric resin film 10A. On the other hand, recesses 42 are present as second recesses on the second surface 12 of the dielectric resin film 10A.

Among the recesses 41A, in addition to the recesses having the same size as the recess 41 shown in FIG. 2, recesses having the same size as the recess 42 are also mixed. On the first surface 11 of the dielectric resin film 10A, the recesses 41 shown in FIG. 2 may be present as the first recesses.

The recesses present on the second surface of the dielectric resin film may be confirmed by observing the second surface of the dielectric resin film with a scanning electron microscope (SEM). In an SEM photograph, a portion that looks black is determined as a recess.

Figure 7:
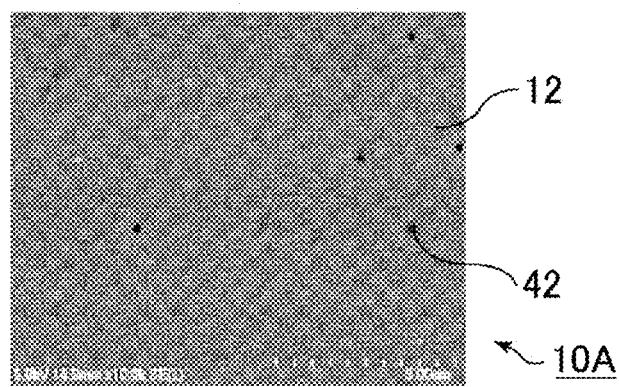
FIG. 7 is an example of an SEM photograph of a second surface of the dielectric resin film that forms the film for a film capacitor of the present invention.

FIG. 7 is an example of an SEM photograph of the second surface of the dielectric resin film that forms the film for a film capacitor of the present invention.

In FIG. 7, it can be confirmed that the recesses 42 are present on the second surface 12 of the dielectric resin film 10A.

In the film for a film capacitor of the present invention, among the recesses present on the second surface of the dielectric resin film, it is preferable that 3 to 11 of second recesses each having a long diameter of 100 nm to 800 nm are present per an area of 13 µm×13 µm.

The number of the second recesses may be determined by observing random areas of the second surface of the dielectric resin film at a magnification of 10,000 times with an SEM and counting the number of recesses each having a long diameter of 100 nm to 800 nm in an observation field of 13 µm×13 µm.

In the film for a film capacitor of the present invention, the dielectric resin film preferably has a glass transition point of 160° C. to 190° C. In this case, the heat resistance of the film capacitor can increase.

In the present specification, the glass transition point of the dielectric resin film means a temperature at which a storage elastic modulus and a loss elastic modulus are measured from a dynamic viscoelasticity measuring device (DMA), and a loss tangent (tan δ) represented by loss elastic modulus/storage elastic modulus exhibits a maximum peak value.

In the film for a film capacitor of the present invention, a weight of a pyrolysis residue when the dielectric resin film is heated to 500° C. under a nitrogen atmosphere (hereinafter, also referred to as a weight of the pyrolysis residue of the dielectric resin film) is preferably less than 20 wt %. In this case, because the dielectric resin film is easily pyrolyzed, a film capacitor having good self-healing properties can be obtained. The weight of the pyrolysis residue of the dielectric resin film is more preferably less than 10 wt %.

In the present specification, the weight of the pyrolysis residue of the dielectric resin film means the weight (%) of the residue at 500° C. measured by raising the temperature of the dielectric resin film from room temperature to 600° C. at a temperature raising rate of 5° C./min in a nitrogen atmosphere using a differential thermogravimetric simultaneous analyzer (TG-DTA).

In the film for a film capacitor of the present invention, the dielectric resin film preferably contains a curable resin as a main component.

In the present specification, "main component" means a component having the largest weight percent, and preferably means a component having a weight percent of more than 50 wt %. Therefore, the dielectric resin film may contain, for example, an additive such as a silicone resin and an uncured portion of a starting material such as a first organic material or a second organic material described later as a component other than the main component.

The curable resin may be a thermosetting resin or a photocurable resin.

In the present specification, the thermosetting resin means a resin that can be cured by heat, and there is no limitation on the curing method. Therefore, as long as the resin can be cured by heat, a resin cured by a method other than heat (for example, light, electron beam, and the like) is also included in the thermosetting resin. In addition, depending on the material, the reaction may start due to the reactivity of the material itself, and a material in which curing proceeds without necessarily applying heat, light, or the like from the outside is also referred to as the thermosetting resin. The same applies to the photocurable resin, and there is no limitation on the curing method.

The curable resin is preferably made of a cured product of a first organic material and a second organic material. Examples thereof include a cured product obtained by reaction between a hydroxyl group (OH group) of the first organic material and an isocyanate group (NCO group) of the second organic material.

When the cured product is obtained by the above reaction, an uncured portion of the starting material may remain in the film. For example, the dielectric resin film may contain at least one of a hydroxyl group and an isocyanate group. In this case, the dielectric resin film may contain either one of a hydroxyl group and an isocyanate group or may contain both a hydroxyl group and an isocyanate group.

The presence of the hydroxyl group and/or the isocyanate group may be confirmed using a Fourier transform infrared spectroscopy (FT-IR).

The first organic material is preferably made of a phenoxy resin.

The second organic material is preferably made of diphenylmethane diisocyanate, diphenylmethane diisocyanate-modified product, or a mixture thereof, and is preferably made of 4,4'-diphenylmethane diisocyanate, 4,4'-diphenylmethane diisocyanate-modified product, or a mixture thereof.

The dielectric resin film may also contain an additive for adding another function. For example, smoothness may be imparted by adding a leveling agent. The additive is more preferably a material having a functional group that reacts with a hydroxyl group and/or an isocyanate group and forming a part of the crosslinked structure of the cured product. Examples of such a material include a resin having at least one functional group selected from the group consisting of a hydroxyl group, an epoxy group, a silanol group, and a carboxyl group.

The thickness of the dielectric resin film is not particularly limited and is preferably 1 µm to 5 µm.

The thickness of the dielectric resin film referred to herein means a thickness measured at a position where no recesses are present on the surface.

The thickness of the dielectric resin film may be measured using an optical film thickness meter.

The film for a film capacitor of the present invention becomes a metalized film by being provided with a metal layer on the first surface of the dielectric resin film and forms the film capacitor of the present invention.

Figure 8:
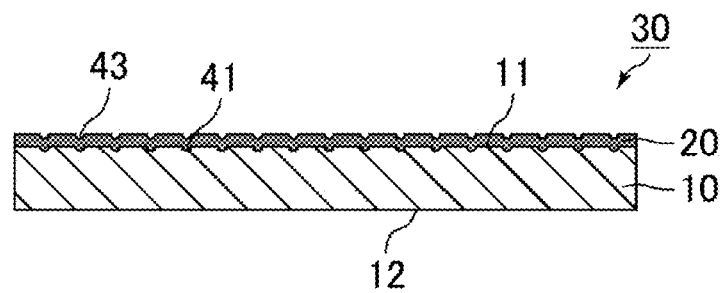
FIG. 8 is a sectional view schematically showing an example of a metalized film that forms the film capacitor of the present invention.

FIG. 8 is a sectional view schematically showing an example of a metalized film that forms the film capacitor of the present invention.

A metalized film 30 shown in FIG. 8 includes the dielectric resin film 10 shown in FIG. 2 and a metal layer 20 provided on the first surface of the dielectric resin film 10. As described above, the recesses 41 are present as first recesses on the first surface 11 of the dielectric resin film 10. On the other hand, no recesses 41 are present on the second surface 12 of the dielectric resin film 10 in FIG. 8. Furthermore, on the surface of the metal layer 20 not in contact with the first surface 11 of the dielectric resin film 10, recesses 43 are present as third recesses, and correspond to the recesses 41 on the first surface 11 of the dielectric resin film 10.

The recesses present on the surface of the metal layer not in contact with the first surface of the dielectric resin film may be confirmed by observing the first surface of the dielectric resin film in a state where the metal layer is provided using a scanning electron microscope (SEM).

In the film capacitor of the present invention, in the first aspect, among the recesses present on the first surface of the dielectric resin film, 25 to 125 of the first recesses each having a long diameter of 30 nm to 800 nm are present per an area of 5 μm×5 μm.

The presence of the first recesses each having a long diameter of 30 nm to 800 nm on the first surface of the dielectric resin film allows the dielectric resin film to be easily pyrolyzed when heat is applied to the dielectric resin film. When insulation breakdown occurs at a certain point of the dielectric resin film during use of the film capacitor, the dielectric resin film generates heat due to the current flowing through the point. When the dielectric resin film is easily pyrolyzed, the dielectric resin film is pyrolyzed by heat generated by a current, and therefore the portion where insulation breakdown occurred disappears, and the insulation property of the dielectric resin film is restored. Therefore, a film capacitor having good self-healing properties can be obtained.

In the film capacitor of the present invention, in the first aspect, it is preferable that 25 to 125 of the third recesses each having a long diameter of 30 nm to 800 nm are present on the surface of the metal layer not in contact with the first surface of the dielectric resin film per an area of 5 μm×5 μm.

In the film capacitor of the present invention, in the second aspect, the first recesses are present on the first surface of the dielectric resin film, and 25 to 125 of third recesses each having a long diameter of 30 nm to 800 nm are present on a surface of the metal layer not in contact with the first surface of the dielectric resin film per an area of 5 μm×5 μm.

The presence of the third recesses each having a long diameter of 30 nm to 800 nm on the surface of the metal layer allows the dielectric resin film to be easily pyrolyzed when heat is applied to the dielectric resin film. Therefore, a film capacitor having good self-healing properties can be obtained.

The number of the third recesses may be determined by observing random areas of the first surface of the dielectric resin film in a state where the metal layer is provided at a magnification of 30,000 times with an SEM and counting the number of recesses each having a long diameter of 30 nm to 800 nm in an observation field of 5 μm×5 μm.

Hereinafter, when the first aspect and the second aspect are not particularly distinguished, they are simply referred to as "the film capacitor of the present invention".

Figure 9:
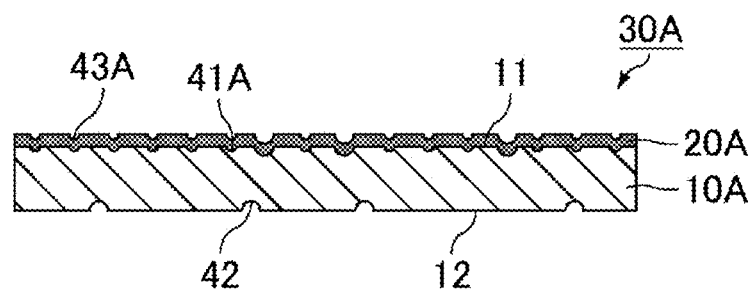
FIG. 9 is a sectional view schematically showing another example of the metalized film that forms the film capacitor of the present invention.

FIG. 9 is a sectional view schematically showing another example of the metalized film that forms the film capacitor of the present invention.

A metalized film 30A shown in FIG. 9 includes the dielectric resin film 10A shown in FIG. 6 and a metal layer 20A provided on the first surface of the dielectric resin film 10A. As described above, the recesses 41A are present as first recesses on the first surface 11 of the dielectric resin film 10A. On the other hand, recesses 42 are present as second recesses on the second surface 12 of the dielectric resin film 10A. On the surface of the metal layer 20A not in contact with the first surface 11 of the dielectric resin film 10A, recesses 43A are present as third recesses, and correspond to the recesses 41A on the first surface 11 of the dielectric resin film 10A.

In addition, on the first surface 11 of the dielectric resin film 10A, the recesses 41 may be present as first recesses in the same manner as in FIG. 8. In this case, the recesses 43 are present as third recesses following the recesses 41 on the surface of the metal layer 20A.

In the film capacitor of the present invention, among the recesses present on the second surface of the dielectric resin film, it is preferable that 3 to 11 of second recesses each having a long diameter of 100 nm to 800 nm are present per an area of 13 μm×13 μm.

The presence of the second recesses each having a long diameter of 100 nm to 800 nm on the second surface of the dielectric resin film provides irregularities on the surface of the dielectric resin film and decreases the friction coefficient, and therefore the slippage of the dielectric resin film improves. As a result, work efficiency such as conveyance and winding of the film improves as compared with a case where the surface of the dielectric resin film is smooth.

In the film capacitor of the present invention, a fuse portion is preferably provided in the metal layer.

The fuse portion means a portion connecting electrode portions in which the metal layer serving as the counter electrode are divided into a plurality of portions. There is no particular limitation on the pattern of the metal layer having the fuse portion, and for example, an electrode pattern disclosed in Japanese Patent Application Laid-Open No. 2004-363431A or Japanese Patent Application Laid-Open No. H5-251266, or the like may be used.

Figure 10:
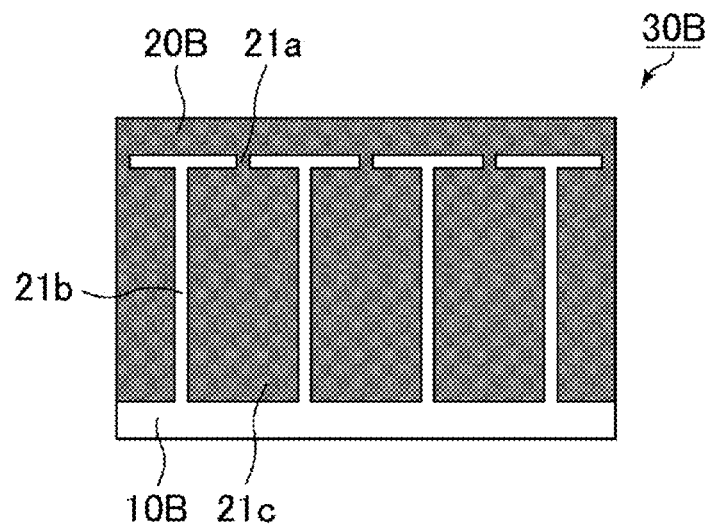
FIG. 10 is a plan view schematically showing still another example of the metalized film that forms the film capacitor of the present invention.

FIG. 10 is a plan view schematically showing still another example of the metalized film that forms the film capacitor of the present invention.

In a metalized film 30B shown in FIG. 10, a metal layer 20B provided on one surface of a dielectric resin film 10B includes a fuse portion 21a formed by thinning a part of an electrode and a divided electrode 21c divided by an insulating slit 21b.

In the film capacitor of the present invention, the fuse portion preferably overlaps with the third recesses in the thickness direction.

The presence of the third recesses at a position overlapping with the fuse portion of the metal layer allows the fuse portion to be thinner, and therefore the reliability of the fuse operation at the time of insulation breakdown can be enhanced.

For example, in the film capacitor 100 shown in FIG. 1, when the fuse portion is provided in both the first metal layer 120 and the second metal layer 150, the fuse portions provided in both of the metal layers may overlap with the third recesses in the thickness direction, or one of the fuse portions provided in one of the metal layers may overlap with the third recesses in the thickness direction. In addition, the fuse portion may be provided in either one of the first metal layer 120 and the second metal layer 150, and the fuse portion may overlap with the third recesses in the thickness direction.

In the film capacitor of the present invention, examples of the metal contained in the metal layer include aluminum or zinc, or the like.

When the material of the metal layer is aluminum or zinc, joinability to the external terminal electrode can be kept good.

The thickness of the metal layer is not particularly limited and is preferably 5 nm to 50 nm.

The thickness of the metal layer may be determined by observing a section of the metalized film cut in the thickness direction with an electron microscope such as a field emission scanning electron microscope (FE-SEM).

[Method for Producing Film for Film Capacitor]

Hereinafter, a method for producing a film for a film capacitor of the present invention will be described.

FIGS. 11A, 11B, 11C, and 11D are process diagrams schematically showing an example of a method for producing the film 1 for a film capacitor shown in FIG. 2.

Figure 11A:
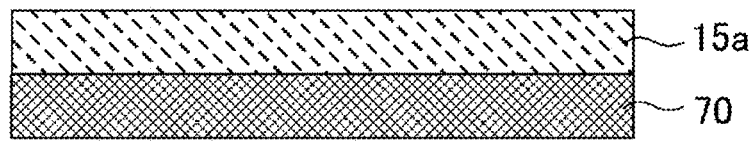
FIGS. 11A, 11B, 11C, and 11D are process diagrams schematically showing an example of a method for producing a film 1 for a film capacitor shown in FIG. 2.

First, as shown in FIG. 11A, a resin solution 15a is applied to a surface to be coated of a substrate film 70.

As the substrate film 70, for example, a polyethylene terephthalate (PET) film, a polypropylene (PP) film, or the like may be used.

The resin solution 15a is prepared by, for example, dissolving and mixing the above-described first organic material and second organic material in a solvent and adding an additive as necessary. In the cured film, the solvent contained in the resin solution may be present as a residue. The weight ratio between the first organic material and the second organic material (first organic material/second organic material) is preferably 50/50 to 75/25.

As the solvent, a mixed solvent containing methyl ethyl ketone (MEK) and tetrahydrofuran (THF) is preferably used. The weight ratio between MEK and THF (MEK/THF) is preferably 15/85 to 85/15.

Figure 11B:
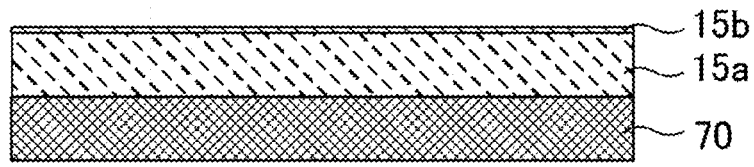

Hot air is applied preferably within 10 seconds after the resin solution 15a is applied to the substrate film 70 to dry the solvent. This allows the surface of the resin solution 15a to solidify and a coating film 15b to be formed on the surface of the resin solution 15a as shown in FIG. 11B.

Figure 11C:
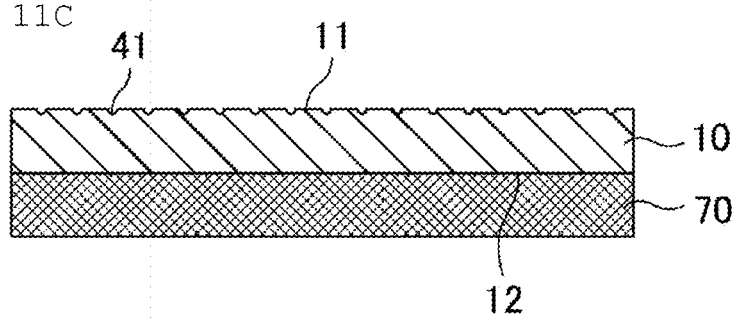

When the drying is further continued, because the coating film 15b is formed on the surface of the resin solution 15a, when the solvent in the resin solution 15a volatilizes and escapes from the inside, an escape path of the gas remains as a hole. This allows the recesses 41 to be formed on the first surface 11 which is on the dry surface side as shown in FIG. 11C. After drying, the resin is cured by heat treatment to form the dielectric resin film 10.

Figure 11D:
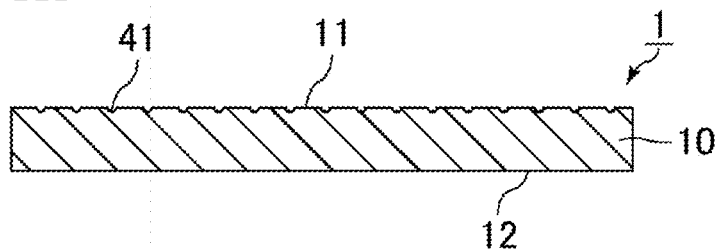

The dielectric resin film 10 is then peeled off from the substrate film 70. This provides the film 1 for a film capacitor in which the recesses 41 are present on the first surface 11 of the dielectric resin film 10 as shown in FIG. 11D.

FIGS. 12A, 12B, and 12C, and FIGS. 13A, 13B, and 13C are process diagrams schematically showing an example of a method for manufacturing the film 1A for a film capacitor shown in FIG. 6.

Figure 12A:
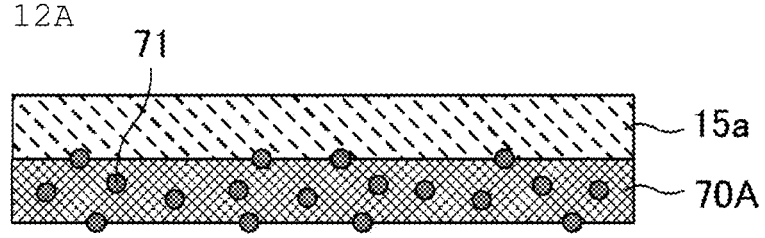
FIGS. 12A, 12B, and 12C are process diagrams schematically showing an example of a method for producing a film 1A for a film capacitor shown in FIG. 6.

First, as shown in FIG. 12A, the resin solution 15a is applied to a surface to be coated of a substrate film 70A.

The substrate film 70A is a film having particles 71 such as silica particles inside and on surfaces thereof, and the particles 71 are attached to both surfaces thereof. It is preferable that the substrate film 70A includes a polypropylene film and the particles 71 kneaded into the polypropylene film and the particles 71 are attached to both surfaces of the substrate film 70A.

As the particles 71, inorganic particles are preferably used, and silica particles are more preferably used. The average particle diameter of the particles 71 is preferably 0.1 μm to 0.4 μm.

Figure 12B:
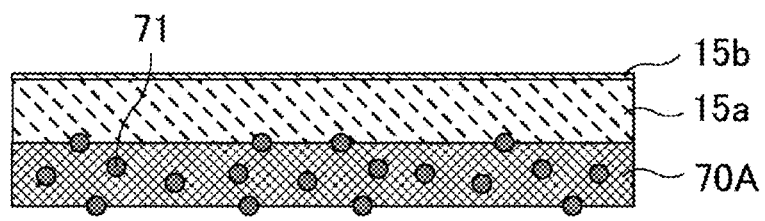

Hot air is applied preferably within 10 seconds after the resin solution 15a is applied to the substrate film 70A to dry the solvent. This allows the surface of the resin solution 15a to solidify and the coating film 15b to be formed on the surface of the resin solution 15a as shown in FIG. 12B.

Figure 12C:
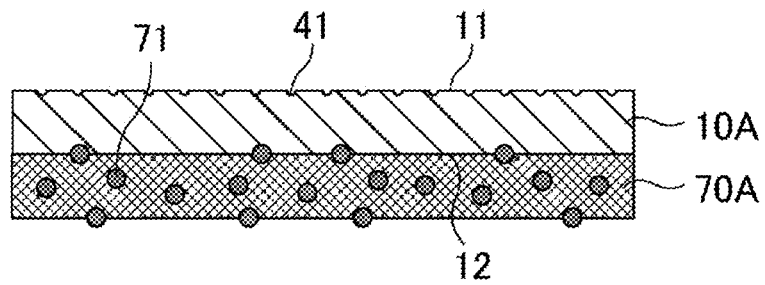

When the drying is further continued, because the coating film 15b is formed on the surface of the resin solution 15a, when the solvent in the resin solution 15a volatilizes and escapes from the inside, an escape path of the gas remains as a hole. This allows the recesses 41 to be formed on the first surface 11 which is on the dry surface side as shown in FIG. 12C. After drying, the resin is cured by heat treatment to form the dielectric resin film 10A.

Figure 13A:
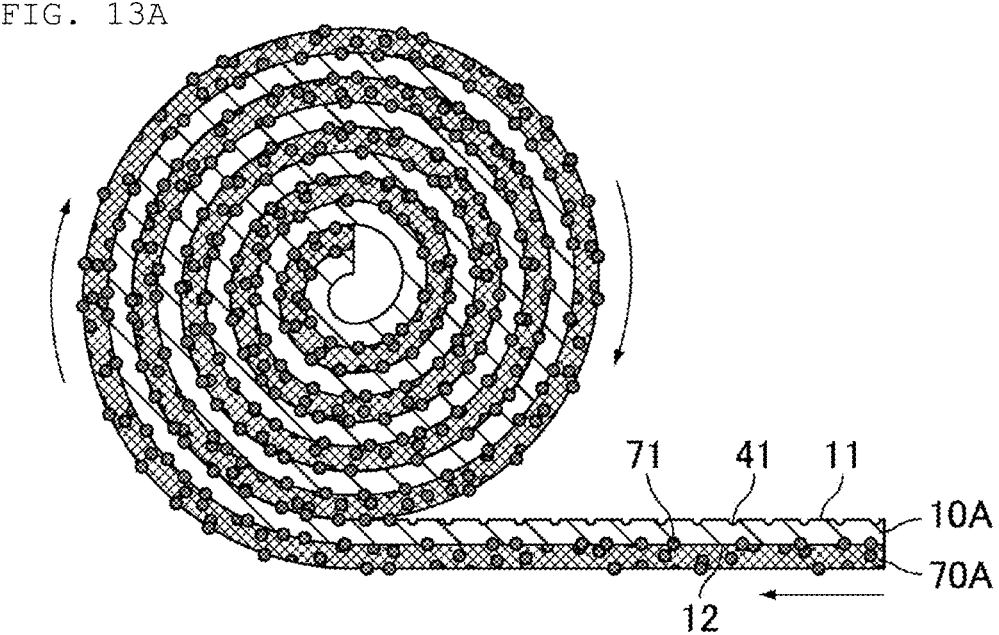
FIGS. 13A, 13B, and 13C are process diagrams schematically showing an example of a method for producing the film 1A for a film capacitor shown in FIG. 6.

Next, as shown in FIG. 13A, a step of winding the coated film having the dielectric resin film 10A formed on the substrate film 70A is performed. In FIG. 13A, the winding direction is indicated by arrows.

When the coated film is wound, the adjacent substrate film 70A comes into contact with the first surface 11 of the dielectric resin film 10A. Because the particles 71 are attached to both surfaces of the substrate film 70A, the particles 71 are also in contact with the first surface 11 of the dielectric resin film 10A.

Figure 13B:
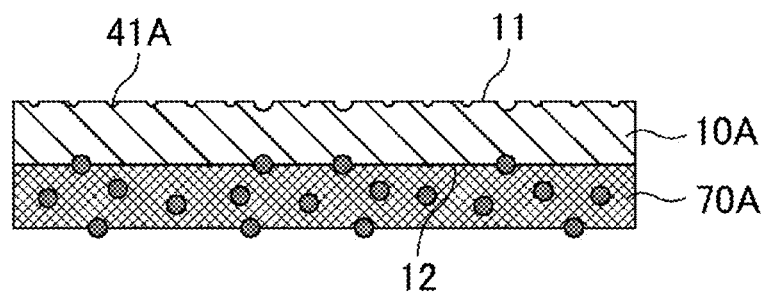

Thereafter, the coated film is rotated in the direction opposite to the winding direction and spread. This allows the shapes of the particles 71 to transfer to the first surface 11 of the dielectric resin film 10A. As a result, the recesses 41A are formed on the first surface 11 of the dielectric resin film 10A as shown in FIG. 13B.

Figure 13C:
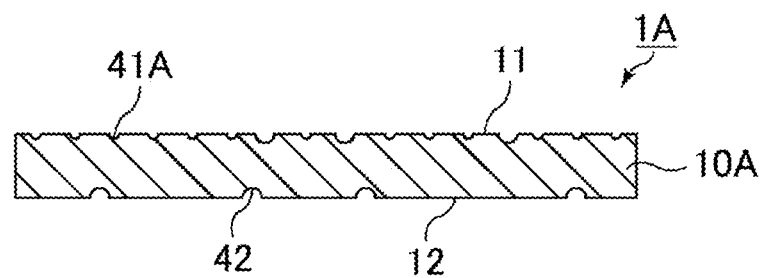

The dielectric resin film 70A is then peeled off from the substrate film 10A. This allows the shapes of the particles 71 to transfer to the second surface 12 of the dielectric resin film 10A. As a result, the film 1A for a film capacitor is obtained in which the recesses 41A are present on the first surface 11 of the dielectric resin film 10A, and the recesses 42 are present on the second surface 12, as shown in FIG. 13C.

In the above example, the step of winding the coated film is performed in a state where the dielectric resin film 10A is formed by curing the resin by heat treatment, but the step of winding the coated film may be performed after drying the solvent. In this case, the dielectric resin film 10A may be formed by rotating the coated film in the direction opposite to the winding direction and spreading it, and after that curing the resin by heat treatment.

Alternatively, after the dielectric resin film 10A is formed, the dielectric resin film 10A may be peeled off from the substrate film 70A without performing the step of winding the coated film shown in FIG. 13A. In this case, a film for a film capacitor is obtained in which the recesses 41 are present on the first surface 11 of the dielectric resin film 10A, and the recesses 42 are present on the second surface 12.

The step of winding the coated film shown in FIG. 13A may also be performed in the case of using the substrate film 70.

[Method for Producing Film Capacitor]

Subsequently, a method for producing the film capacitor of the present invention will be described.

First, a metalized film is obtained by forming a metal layer on the first surface of the dielectric resin film of the film for a film capacitor of the present invention. Examples of the method for forming the metal layer on the first surface of the dielectric resin film include vapor deposition, or the like.

For example, as shown in FIG. 11C, in a state where the dielectric resin film 10 is formed on the substrate film 70, vapor deposition or the like may be performed on the surface of the dielectric resin film 10 opposite to the substrate film 70 to form the metal layer 20 on a surface of the dielectric resin film 10. The surface provided with the metal layer 20 in this manner serves as the first surface 11 of the dielectric resin film 10, and the surface on the substrate film 70 side serves as the second surface 12 of the dielectric resin film 10. The metalized film obtained by peeling the substrate film 70 after the above step is a metalized film 30 shown in FIG. 8.

Alternatively, as shown in FIG. 13B, in a state where the dielectric resin film 10A is formed on the substrate film 70A, vapor deposition or the like may be performed on the surface of the dielectric resin film 10A opposite to the substrate film 70A to form the metal layer 20A on the surface of the dielectric resin film 10A. The surface provided with the metal layer 20A in this manner serves as the first surface 11 of the dielectric resin film 10A, and the surface on the substrate film 70A side serves as the second surface 12 of the dielectric resin film 10A. The metalized film obtained by peeling the substrate film 70A after the above step is a metalized film 30A shown in FIG. 9.

A metal layer may be formed on the first surface of the dielectric resin film after the dielectric resin film is peeled off from the substrate film.

Two of such metalized films are shifted by a predetermined distance in the width direction and stacked, and then wound to obtain a stacked body. When necessary, the stacked body may be pressed into an elliptical cylindrical shape by sandwiching the stacked body from a direction perpendicular to the width direction.

Subsequently, by forming external terminal electrodes on the end surfaces of the stacked body, a film capacitor as shown in FIG. 1 is obtained. Examples of a method for forming the external terminal electrodes on the end surfaces of the stacked body include thermal spray.

EXAMPLES

Hereinafter, examples more specifically disclosing the film capacitor and the film for a film capacitor of the present invention will be described. The present invention is not limited only to these examples.

Example 1

[Production of Film for Film Capacitor]

A phenoxy resin as a first organic material and a mixture of 4,4'-diphenylmethane diisocyanate (MDI) and a modified product thereof as a second organic material were dissolved in a mixture solvent of methyl ethyl ketone (MEK) and tetrahydrofuran (THF) (MEK/THF=85/15 (weight ratio)) and mixed, and a silicone-based surface conditioner BYK370 (manufactured by BYK Japan KK) was further added thereto to prepare a coating composition (resin solution). The weight ratio between the first organic material and the second organic material (first organic material/second organic material) was 70/30.

The coating composition was applied onto a PET film as a substrate film, and hot air of 70° C. was applied thereto 4.5 seconds after the application to dry the solvent, thereby forming a film having a thickness of 3 μm. After drying, the coated film was wound. Thereafter, the wound coated film was rotated in the direction opposite to the winding direction and spread, and subsequently, a heat treatment was performed at 150° C. for 4 hours to cure the dielectric resin film. Furthermore, the dielectric resin film was peeled off from the PET film, whereby a film for a film capacitor of Example 1 was produced. The surface opposite to the PET film is the first surface, and the surface on the PET film side is the second surface.

[Production of Film Capacitor]

A film for a film capacitor was formed on a PET film by the same method as described above. Aluminum was vapor-deposited on the first surface of the film for a film capacitor to have a thickness of 20 nm, and then peeled off from the PET film to obtain a metalized film.

Next, the peeled metalized film was cut at a predetermined width, and then wound with a winding machine in a state where two of the metalized films were overlapped each other. The obtained cylindrical wound body was pressed to have an elliptical shape, and then zinc was metallic-sprayed on the end surfaces to form terminal electrodes, and the terminal electrodes were conducted with counter electrodes to produce a film capacitor of Example 1.

[Production of Sample for Evaluating Self-Healing Property]

After terminal conductors were attached to the terminal electrodes of the film capacitor of Example 1, the wound body was resin-sealed to produce a sample for evaluating self-healing properties.

Example 2

A film for a film capacitor, a film capacitor, and a sample for evaluating self-healing properties were produced in the same manner as in Example 1 except that a polypropylene film (manufactured by Toray Industries, Inc.: TORAYFAN, 12 μm thick) in which silica particles having an average particle diameter of 0.1 μm (particle size distribution: 0.04 μm to 0.3 μm) and an average particle diameter of 0.4 μm (particle size distribution: 0.2 μm to 0.6 μm) were attached to the surface was used as the substrate film.

Comparative Example 1

A film for a film capacitor, a film capacitor, and a sample for evaluating self-healing properties were produced in the same manner as in Example 1 except that a polyvinyl acetoacetal (PVAA) resin as the first organic material and a toluene diisocyanate (TDI) modified product as the second organic material were dissolved in MEK and mixed, and a silicone-based surface conditioner BYK370 was further added thereto to prepare a coating composition.

Comparative Example 2

A film for a film capacitor, a film capacitor, and a sample for evaluating self-healing properties were produced in the same manner as in Example 1 except that polyarylate (UNIFINER manufactured by Unitika Ltd.), which is a thermoplastic resin, was dissolved in THF to prepare a coating composition.

Comparative Example 3

A phenoxy resin as the first organic material and a mixture of 4,4'-MDI and a modified product thereof as the second organic material were dissolved in MEK and mixed, and a silicone-based surface conditioner BYK370 was further added thereto to prepare a coating composition. A film for a film capacitor, a film capacitor, and a sample for evaluating self-healing properties were produced in the same manner as in Example 1 except that the coating composition was applied onto a PET film, and hot air of 70° C. was applied thereto 11 seconds after the application to dry the solvent.

[Glass Transition Point]

The glass transition point of the film for a film capacitor of each Example and Comparative Example was measured. The glass transition point was measured by peeling the above-described thermally cured film from the substrate film and using a dynamic viscoelasticity measuring apparatus (RSA-III manufactured by TA Instruments, Inc.). The measurement conditions were as follows: the temperature was raised from room temperature to 250° C. at a temperature raising rate of 10° C./min, the measurement frequency was set to 10 rad/sec, the strain was set to 0.1%, and the loss tangent (tan δ) was determined.

[Pyrolysis Residue]

For the film for a film capacitor of each Example and Comparative Example, the weight of the pyrolysis residue was measured. The above-described thermally cured film was peeled off from the substrate film, and the temperature was raised from room temperature to 600° C. at a temperature raising rate of 5° C./min in a nitrogen atmosphere with a simultaneous thermogravimetric/differential thermal analyzer, and the weight (%) of the residue at 500° C. was measured.

[Number of Recesses]

For the film for a film capacitor of each Example and Comparative Example, the number of recesses present on the surfaces of the first surface and the second surface was measured. The above-described thermally cured film was peeled off from the substrate film, and the first surface was observed with an SEM at a magnification of 30,000 times, and the number of recesses each having a long diameter of 30 nm to 800 nm was counted in an observation field of 5 μm×5 μm (described as "5 μm□" in Table 1). The second surface was observed with an SEM at a magnification of 10,000 times, and the number of recesses each having a long diameter of 100 nm to 800 nm was counted in an observation field of 13 μm×13 μm (described as "13 μm□" in Table 1).

In Example 1, the surface of the metalized film peeled from the substrate film was also observed with an SEM at a magnification of 30,000 times, and the number of recesses each having a long diameter of 30 nm to 800 nm was counted in an observation field of 5 μm×5 μm. As a result, it was possible to confirm recesses on the surface on the first surface side of the film in a state where the metal layer was vapor-deposited, and the number of recesses was the same as the number of recesses present on the first surface of the film.

[Self-Healing Property]

A DC voltage of 1500V was applied to the sample for evaluating self-healing properties of each Example and Comparative Example at 125° C. to observe the state of the voltage, and whether the applied voltage instantaneously decreased at the time of insulation breakdown recovers to the original applied voltage was evaluated. For five samples for each Example and Comparative Example, the self-healing properties were evaluated as ○ (good) when the voltage recovered in all the samples, the self-healing property was evaluated as Δ (acceptable) when the voltage recovered in one to four samples, and the self-healing property was evaluated as × (unacceptable) when the voltage did not recover in any of the samples.

TABLE 1

| | Film composition | Glass transition point [° C.] | Weight of pyrolysis residue [wt %] | Number of recesses First surface [/5 μm□] | Number of recesses Second surface [/13 μm□] | Self-healing property |
|---|---|---|---|---|---|---|
| Example 1 | phenoxy/MDI | 175 | 5 | 95 | 0 | ○ |
| Example 2 | phenoxy/MDI | 175 | 5 | 95 | 10 | ○ |
| Comparative Example 1 | PVAA/TDI | 180 | 5 | 0 | 0 | Δ |
| Comparative Example 2 | polyarylate | 270 | 40 | 0 | 0 | × |
| Comparative Example 3 | phenoxy/MDI | 175 | 8 | 0 | 0 | Δ |

As shown in Table 1, Examples 1 and 2 in which recesses each having a long diameter of 30 nm to 800 nm are present on the first surface of the film have excellent self-healing properties as compared with Comparative Examples 1 to 3.

Although not shown in Table 1, in Example 2 in which recesses each having a long diameter of 100 nm to 800 nm are present on the second surface of the film, the slipperiness when the films are overlapped each other is improved as compared with Example 1.

The slipperiness when the films were overlapped each other was evaluated by measuring the frictional force by the following method.

Figure 14:
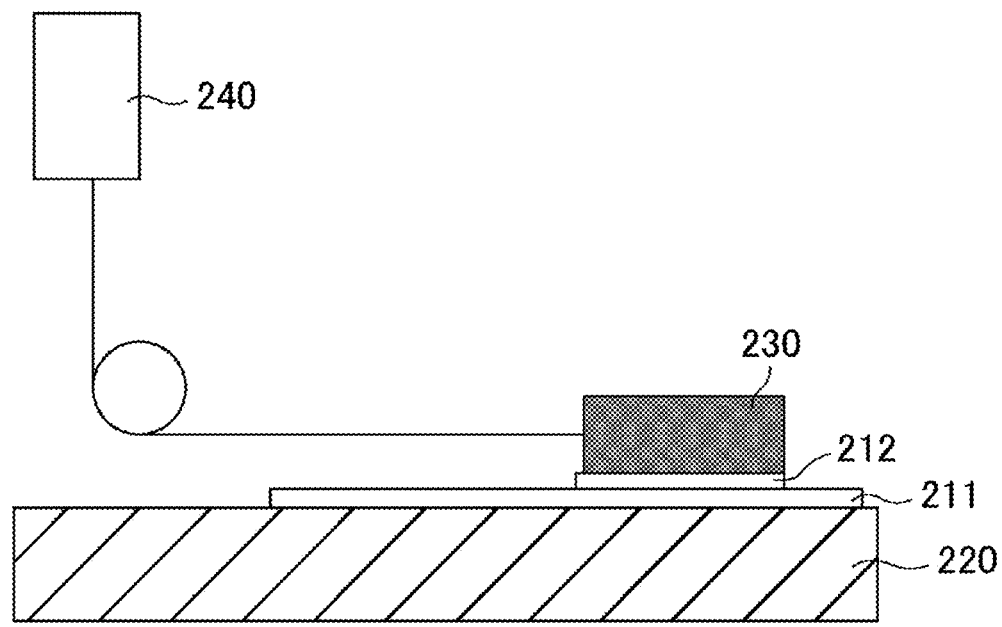
FIG. 14 is a schematic view for explaining a method for measuring a frictional force when films are overlapped each other.

FIG. 14 is a schematic view for explaining a method for measuring the frictional force when the films are overlapped each other.

A film 211 peeled from the substrate is placed on a support base 220 such that the first surface faces upward. Next, a film 212 peeled off from the substrate is stacked such that the second surface is in contact with the first surface of the film 211. Further, a weight 230 of 200 g is placed on the film 212. The film 212 and the weight 230 are fixated. The weight 230 was pulled horizontally at a speed of 150 mm/min, and the force applied at that time was measured with a force gauge 240 (digital force gauge manufactured by IMADA CO., LTD.).

DESCRIPTION OF REFERENCE SYMBOLS 1, 1A: Film for film capacitor
10, 10A, 10B, 10a: Dielectric resin film
11: First surface of dielectric resin film
12: Second surface of dielectric resin film
15a: Resin solution
15b: Coating film 20, 20A, 20B: Metal layer
21a: Fuse portion
21b: Insulating slit
21c: Divided electrode
30, 30A, 30B: Metalized film
41, 41A, 42, 43, 43A: Recess
70, 70A: Substrate film
71: Particle
100: Film capacitor
110: First dielectric resin film
120: First metal layer
130: First metalized film
140: Second dielectric resin film
150: Second metal layer
160: Second metalized film
170: First external terminal electrode
180: Second external terminal electrode
211, 212: Film
220: Support base
230: Weight
240: Force gauge
D: Long diameter of recess

The invention claimed is:

1. A film capacitor comprising:
a dielectric resin film having a first surface and a second surface facing each other in a thickness direction of the dielectric resin film, wherein the first surface of the dielectric resin film includes 25 to 125 of first recesses each having a long diameter of 30 nm to 800 nm per an area of 5 μm×5 μm; and
a metal layer on the first surface of the dielectric resin film.

2. The film capacitor according to claim 1, wherein the second surface of the dielectric resin film includes 3 to 11 of second recesses each having a long diameter of 100 nm 800 nm per an area of 13 μm×13 μm.

3. The film capacitor according to claim 2, wherein a surface of the metal layer not in contact with the first surface of the dielectric resin film includes 25 to 125 of third recesses each having a long diameter of 30 nm to 800 nm per an area of 5 μm×5 μm and which correspond to the first recesses on the first surface of the dielectric resin film.

4. The film capacitor according to claim 3, wherein the metal layer includes a fuse portion that overlaps with the third recesses in the thickness direction.

5. The film capacitor according to claim 1, wherein
the dielectric resin film contains a cured product of a first organic material and a second organic material,
the first organic material is made of a phenoxy resin, and
the second organic material is made of diphenylmethane diisocyanate, a diphenylmethane diisocyanate-modified product, or a mixture thereof.

6. A film capacitor comprising:
a dielectric resin film having a first surface and a second surface facing each other in a thickness direction of the dielectric resin film, wherein the first surface of the dielectric resin film includes 25 to 125 of first recesses each having a long diameter of 30 nm to 800 nm per an area of 5 μm×5 μm; and
a metal layer on the first surface of the dielectric resin film,
wherein a surface of the metal layer not in contact with the first surface of the dielectric resin film includes 25 to 125 of third recesses each having a long diameter of 30 nm to 800 nm per an area of 5 μm×5 μm and which correspond to the first recesses on the first surface of the dielectric resin film.

7. The film capacitor according to claim 6, wherein the metal layer includes a fuse portion that overlaps with the third recesses in the thickness direction.

8. A film capacitor comprising:
a dielectric resin film having a first surface and a second surface facing each other in a thickness direction of the dielectric resin film, wherein the first surface of the dielectric resin film includes 25 to 125 of first recesses each having a long diameter of 30 nm to 800 nm per an area of 5 μm×5 μm; and
a metal layer on the first surface of the dielectric resin film, wherein
the dielectric resin film has a glass transition point of 160° C. to 190° C., and
a weight of a pyrolysis residue when the dielectric resin film is heated to 500° C. under a nitrogen atmosphere is less than 20 wt %.

9. A film capacitor comprising:
a dielectric resin film having a first surface and a second surface facing each other in a thickness direction of the dielectric resin film, wherein the first surface of the dielectric resin film includes first recesses; and
a metal layer on the first surface of the dielectric resin film, wherein a surface of the metal layer not in contact with the first surface of the dielectric resin film includes 25 to 125 of third recesses each having a long diameter of 30 nm to 800 nm per an area of 5 μm×5 μm and which correspond to the first recesses on the first surface of the dielectric resin film.

10. The film capacitor according to claim 9, wherein the second surface of the dielectric resin film includes 3 to 11 of second recesses each having a long diameter of 100 nm to 800 nm per an area of 13 μm×13 μm.

11. The film capacitor according to claim 10, wherein the metal layer includes a fuse portion that overlaps with the third recesses in the thickness direction.

12. The film capacitor according to claim 9, wherein the metal layer includes a fuse portion that overlaps with the third recesses in the thickness direction.

13. The film capacitor according to claim 9, wherein
the dielectric resin film has a glass transition point of 160° C. to 190° C., and
a weight of a pyrolysis residue when the dielectric resin film is heated to 500° C. under a nitrogen atmosphere is less than 20 wt %.

14. The film capacitor according to claim 9, wherein
the dielectric resin film contains a cured product of a first organic material and a second organic material as a main component,
the first organic material is made of a phenoxy resin, and
the second organic material is made of diphenylmethane diisocyanate, a diphenylmethane diisocyanate-modified product, or a mixture thereof.

15. A film for a film capacitor comprising:
a dielectric resin film having a first surface and a second surface facing each other in a thickness direction of the dielectric resin film,
wherein the first surface of the dielectric resin film includes 25 to 125 of first recesses each having a long diameter of 30 nm to 800 nm per an area of 5 μm×5 μm.

16. The film for a film capacitor according to claim 15, wherein the second surface of the dielectric resin film includes 3 to 11 of second recesses each having a long diameter of 100 nm to 800 nm per an area of 13 μm×13 μm.

17. The film for a film capacitor according to claim 15, wherein the dielectric resin film has a glass transition point of 160° C. to 190° C., and a weight of a pyrolysis residue when the dielectric resin film is heated to 500° C. under a nitrogen atmosphere is less than 20 wt %.

18. The film for a film capacitor according to claim 15, wherein the dielectric resin film contains a cured product of a first organic material and a second organic material, the first organic material is made of a phenoxy resin, and the second organic material is made of diphenylmethane diisocyanate, a diphenylmethane diisocyanate-modified product, or a mixture thereof.

* * * * *